United States Patent [19]

Hendricks

[11] 4,322,378
[45] Mar. 30, 1982

[54] METHOD FOR PRODUCING UNIFORM SPHERICAL SHELLS

[75] Inventor: Charles D. Hendricks, Livermore, Calif.

[73] Assignee: University of Illinois Foundation, Urbana, Ill.

[21] Appl. No.: 119,909

[22] Filed: Feb. 8, 1980

Related U.S. Application Data

[63] Continuation of Ser. No. 915,936, Jun. 15, 1978, abandoned.

[51] Int. Cl.³ .............................................. B29C 23/00
[52] U.S. Cl. ............................................ 264/7; 264/9; 264/14; 264/23; 264/28
[58] Field of Search ....................... 264/5, 9, 14, 28, 7, 264/23

[56] References Cited

U.S. PATENT DOCUMENTS

| | | | |
|---|---|---|---|
| 2,510,574 | 6/1950 | Greenhalgh | 264/9 |
| 3,060,510 | 10/1962 | Fischer et al. | 264/14 |
| 3,389,194 | 6/1968 | Somerville | 264/4 |
| 3,985,841 | 10/1976 | Turnbull et al. | 264/9 |
| 4,013,744 | 3/1977 | Kuerten | 264/14 |

*Primary Examiner*—James R. Hall
*Attorney, Agent, or Firm*—Martin Novack

[57] ABSTRACT

The disclosure is directed to a method for producing relatively uniform hollow spheres of a substance, the hollow spheres being formed with a gas therein as a result of the production process. The spheres, formed for example of hydrogen isotopes, are particularly useful as a fuel target for laser fusion applications. In accordance with the method of the invention, a jet of the substance of which the spheres are to be formed is provided in liquid form. Relatively uniform gas bubbles are injected into the liquid jet. In this manner, the bubbles break up or separate the liquid jet into relatively uniform hollow spheres of the substance, each with a bubble of the gas inside. The hollow spheres can be visualized as liquid droplets, each having a relatively uniform gas bubble therein. In accordance with a feature of the invention, a periodic mechanical disturbance, such as is obtained by exciting an ultrasonic transducer, is introduced to a gas stream, and tends to cause the gas stream to form relatively uniform bubbles within the liquid droplets.

14 Claims, 3 Drawing Figures

METHOD FOR PRODUCING UNIFORM SPHERICAL SHELLS

This is a continuation of application Ser. No. 915,936, filed June 15, 1978, now abandoned.

BACKGROUND OF THE INVENTION

This invention relates to the production of hollow spherical shells of material and, more particularly, to a method for producing uniform hollow shells of a liquid which have particular application for use as targets in laser fusion.

Controlled thermonuclear fusion holds promise of being one of the solutions to long term energy shortage problems. One problem in releasing fusion energy is to confine an intense hot plasma, for example plasma of hydrogen isotopes deuterium-tritium, long enough for fusion reactions to take place. Techniques of inertial confinement are currently being investigated as an answer to this problem. This calls for rapidly compressing fuel material to high densities. One technique, called laser fusion, utilizes high powered lasers to implode small fuel pellets, for example pellets of hydrogen isotopes deuterium-tritium, to thousands of times their normal liquid density and thereby initiate a fusion reaction. The laser light is focused onto a low density atmosphere of material as it evaporates from the surface of the pellet. This light is absorbed in the plasma atmosphere by electron-ion collisions or by plasma instabilities. In both cases the hot electrons travel in toward the center of the pellet and heat the pellet surface. The surface cools itself by ablation, that is by rapidly expelling material. This material travelling outward creates an equal and opposite force which compresses the pellet. The compression continues until the pressure created is greater than the ablation force.

One of the problems encountered in laser fusion is that plasma instabilities due to using high powered lasers tend to create extremely energetic electrons. These electrons can penetrate the core of the fuel pellet prematurely, thus making compression more difficult; a phenomenon called "preheat". These electrons also have a long range and therefore reduce the heat transfer between the pellet surface and the plasma atmosphere which results in uneven heating of the pellet, known as "decoupling".

The threshold for plasma instabilities can be increased by using hollow fuel pellets. In such case, the ablation pressure acts for a longer time and over a larger area and volume, so that less laser intensity is needed for implosion. However, a problem exists in producing hollow fuel pellets, ideally hollow spheres of the fuel material, which are of consistently uniform size, shape and thickness. Relatively uniform droplets of liquids have been produced by forcing a liquid out of a nozzle under pressure and using acoustical vibration to obtain uniformity of the droplets (see Schneider and Hendricks, *Review of Scientific Instruments*, 35, 1349 (1964)). Hollow droplets have also been produced by ultrasonically nucleating bubbles in superheated liquid drops of hydrogen, as disclosed in Foster, Hendricks, and Turnball, *Applied Physics Letters*, 26, 580 (1975).

It is an object of the present invention to provide a novel method for producing improved relatively uniform hollow spheres of a substance which can be utilized as targets for laser fusion, or utilized for other purposes.

SUMMARY OF THE INVENTION

The present invention is directed to a method for producing relatively uniform spherical shells or hollow spheres of a substance, the hollow spheres being formed with a gas therein as a result of the production process. The shells, formed for example of hydrogen isotopes, are particularly useful as a fuel target for laser fusion applications. In accordance with the method of the invention, a jet of the substance, of which the spheres are to be formed, is provided in liquid form. Relatively uniform gas bubbles are injected into the liquid jet. In this manner, the bubbles break up or separate the liquid jet into relatively uniform hollow spheres of the substance, each with a bubble of the gas inside. The hollow spheres can be visualized as liquid droplets, each having a relatively uniform gas bubble therein. In accordance with a feature of the invention, a periodic mechanical disturbance such as is obtained by exciting an ultrasonic transducer is introduced to a gas stream, and tends to cause the gas stream to form relatively uniform bubbles within the liquid droplets.

In accordance with an embodiment of the apparatus for practicing the method of the invention, an inner nozzle is provided for receiving the gas and generating a stream of the gas at an outlet end of the nozzle. An outer nozzle is disposed outside the inner nozzle, and is preferably coaxial therewith. The outer nozzle is adapted to receive, in liquid form, the substance of which the hollow spheres are to be formed, and has an outlet end for producing jet of the liquid surrounding the gas stream. Means are provided for periodically disturbing the gas stream. Preferably, the periodic disturbance is obtained utilizing a piezoelectric transducer, coupled to the inner nozzle, which generates ultrasonic energy. In this embodiment, the inner and outer nozzle each preferably taper substantially exponentially at their outlet ends.

In accordance with a further feature of the invention, there is set forth a method for producing coated shells of cryogenic materials which may be maintained in liquid form for some period of time and are useful for processes such as controlled thermonuclear phenomena and laser fusion. In this technique, a vapor of the cryogenic material is generated. Also generated is a relatively uniform particle at a temperature which is substantially below the boiling point of the cryogenic material. This particle may be, for example, the previously described spherical shell. The shell is passed through the vapor to obtain a condensed outer coating or shell of the cryogenic material.

Further features and advantages of the invention will become more readily apparent from the following detailed description when taken in conjunction with the accompanying drawings.

DESCRIPTION OF THE PREFERRED EMBODIMENT

Figure 1:
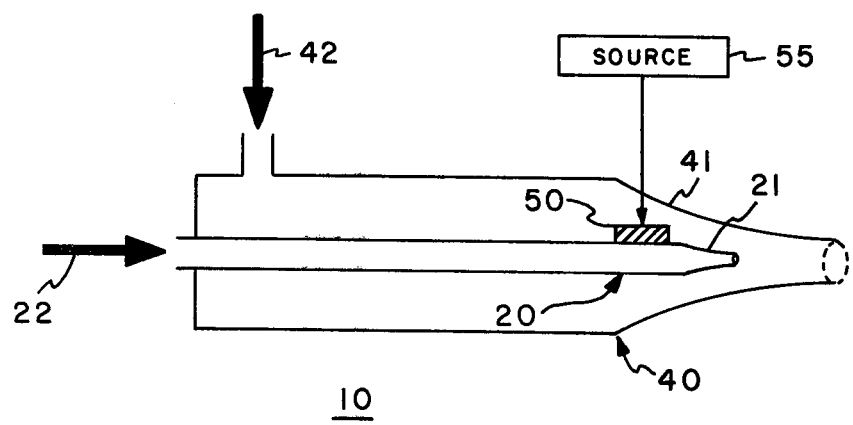
FIG. 1 is a cross-sectional view of an appartus for practicing the method in accordance with the invention.

Referring to FIG. 1, there is shown an embodiment of an apparatus 10 useful in practising the method of the invention. An inner nozzle 20 and an outer nozzle 40 are mounted in substantially coaxial relationship. In the present embodiment, the nozzles are capillary tubes formed of glass. A piezoelectric transducer 50, of a type which produces ultrasonic acoustic waves, is mechanically coupled to the inner nozzle 20. A source 55 of electrical energy is provided for exciting the transducer 50. In the present embodiment, the inner nozzle tapers at its outlet end 21, the taper preferably being of a substantially exponential shape. The outer nozzle is also exponentially tapered at its outlet end, as indicated by reference numeral 41. The transducer 50 mechanically excites the inner nozzle 20 at an ultrasonic frequency, and the effect of the taper is to amplify the ultrasound wave at the outlet end 21 of the inner nozzle 20. A source of a liquid substance, such as liquid hydrogen isotopes, is coupled under pressure into the outer nozzle, as represented by arrow 42. The source of a gas, which may be, for example, helium, and will occupy the center of the hollow spheres to be formed, is input under pressure to the inner nozzle 20, as represented by the arrow 22.

Figure 2:
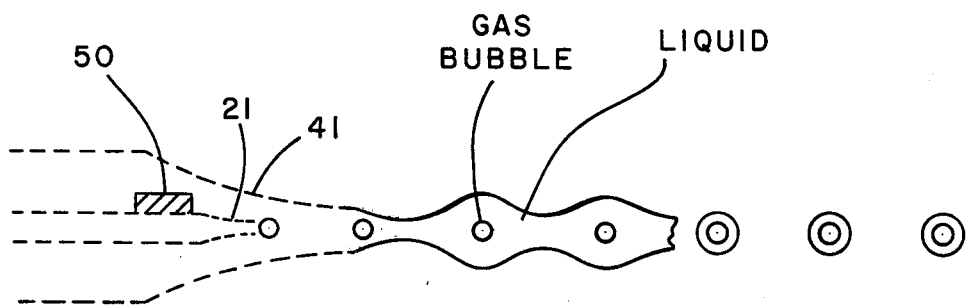
FIG. 2 is a simplified diagram which illustrates the manner of formation of the spherical shells in accordance with the invention.

It has been demonstrated in the prior art that forcing a liquid through a capillary tube of cylindrical cross section with sufficient velocity results in a liquid jet which will disintegrate, downstream from the capillary tip, into droplets. The droplets will generally be random in size and separation. In the present invention, the transducer 50 provides a controlled mechanical disturbance to the gas jet emanating from the outlet end 21 of nozzle 20. Applicant has discovered that this disturbance provides controlled separation or break-up of the gas jet into bubbles, this operation being particularly effective due to the amplification factor of the exponential "horn" (i.e., the horn shape provided by the taper) and the fact that the horn is designed to be resonant at about the transducer center frequency. As illustrated in the simplified diagram of FIG. 2, the resultant gas bubbles, whose spacing and size can be controlled by selecting the output frequency of transducer 50, are injected into the surrounding liquid jet resulting in the production of relatively uniformly spaced and sized hollow drops or shells of the liquid substance filled with the gas.

In an experimental embodiment of the apparatus of FIG. 1, the liquid nozzle 40 was fabricated to produce approximately 300 μm drops while the inner nozzle 20 was designed with an inner diameter of 50 μm, both having relatively the same exponential taper. The outer nozzle has an inner diameter of 9 mm tapering exponentially to 0.20 mm in 1 cm. The inner nozzle had an inner diameter of 1 mm tapering exponentially to 0.05 mm in 1 cm. The transducer had a 25 kHz resonant frequency. Experiments with the system were performed using liquid freon and nitrogen gas. The inner nozzle position, fluid pressure, gas pressure, and excitation frequency were varied about a point where the hollow drops are produced. The liquid pressure (outer nozzle) was raised until a liquid jet issued from the nozzle at a velocity sufficient to give a fairly flat trajectory over a distance of about 30 cm. At this time the jet formed drops of varying the size and random spacing. The gas pressure (inner nozzle) was raised to a level where the drops visibly grew about 25%. It was observed that drop size and spacing became quite uniform as the inner gas flow acted as a perturbation upon the fluid jet. Upon applying power to the transducer, uniform drop size and spacing were controllable over a range of excitation frequencies.

This growth in size and visual observation of the shells produced were indications that hollow drops were being produced. Varying gas pressure above and below the production point indicated readily the growth and shrinkage, respectively, of the shells. The operational boundaries of the system, between which hollow drop production occurs, were determined by a range of nozzle pressures as follows. One extreme, zero gas pressure, results in homogeneous liquid drops. On the other hand, bursting and random spraying of the shells occur for a gas pressure much greater than fluid pressure. Hollow drops were produced using various combinations of flows, excitation settings, and nozzle positions.

Figure 3:
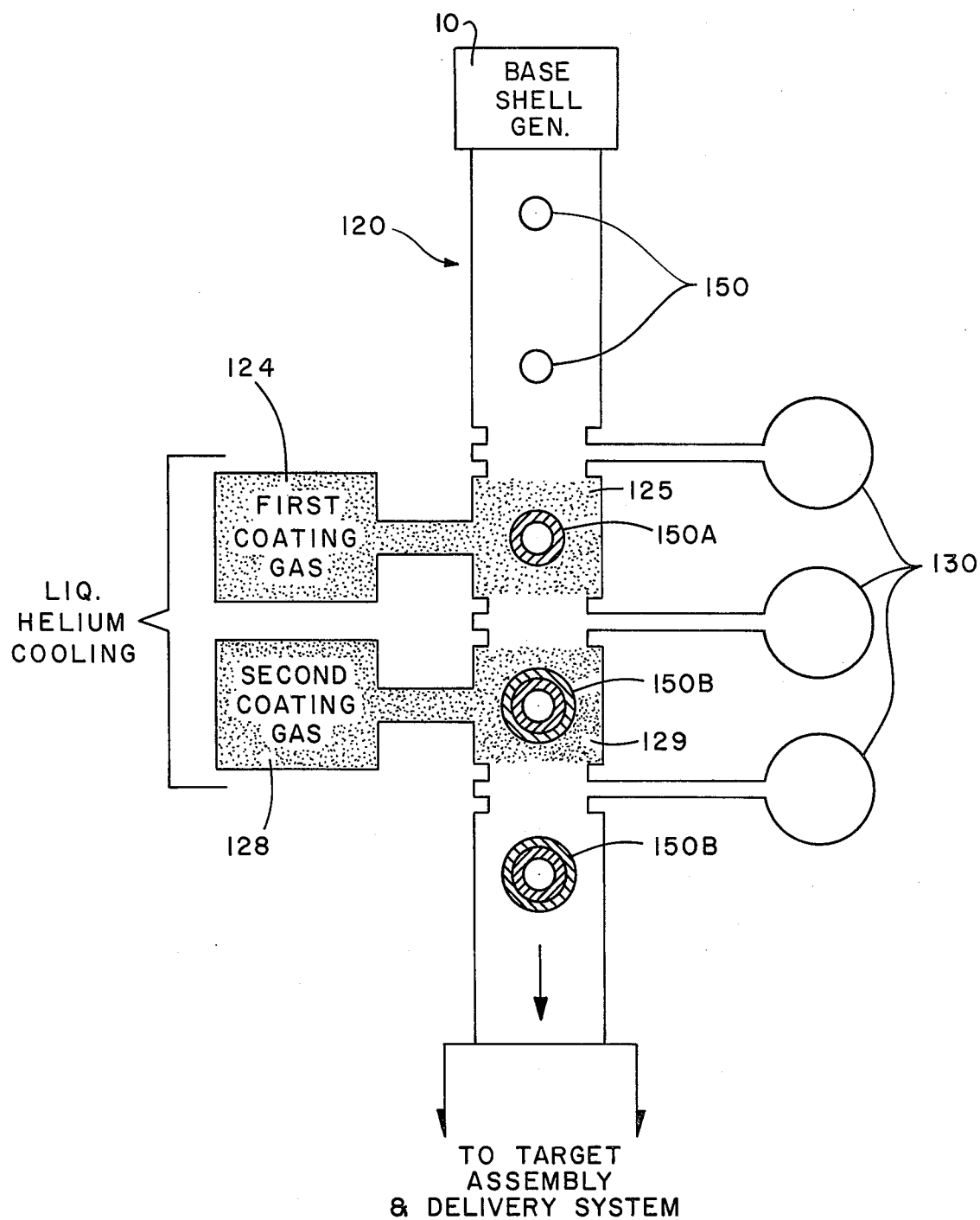
FIG. 3 is a schematic block diagram of a system for practicing the method of the invention whereby coatings of cryogenic material are applied to a base shell.

In accordance with a further aspect of the invention, there are produced hollow shells of cryogenic materials, such as deuterium, deuterium-tritium, other hydrogen isotopes, oxygen, nitrogen, or other materials which may be maintained in liquid form for some period of time and are useful for processes such as controlled thermonuclear phenomena and laser fusion. The method, whereby shells or coatings of the cryogenic material are applied to a base particle which is at a temperature substantially below the boiling point of the cryogenic material, is illustrated with the aid of FIG. 3. Extremely cold particles of the base material are produced by the unit 10 which is preferably, although not necessarily, an apparatus for producing hollow liquid shells of the type set forth in FIG. 1. Following the formation of hollow liquid spheres they are caused to freeze by allowing them to pass into a low pressure region wherein the liquid begins to evaporate, which results in self freezing of the shells. The frozen shells, typically of hydrogen, are directed through a processing channel 120 where they are exposed to the coating gases 125 and 129.

In the present example, these gases are neon and xenon, and are respectively delivered from sources 124 and 128. Differential pump system 130 is utilized to maintain the requisite pressure, and liquid helium cooling is provided between stages to maintain sufficiently low shell temperature. As the shells 150 pass through the processing channel 120, the first gas (neon in this case) condenses on the shells which are at a temperature substantially below the boiling point of neon, to form a coated shell 150A. This coated shell is then passed to the region where the second gas (xenon in this case) is present and it, in turn, condenses on shell 150A to form a double coated shell. The shell 150B will then typically be passed to a target assembly and delivery system.

The invention has been described with reference to particular preferred embodiments, but variations within the spirit and scope of the invention will occur to those skilled in the art. For example, it will be understood that any suitable gas, shell material, and coating material can be employed. Deuterated or tritiated methane, deuterated or tritiated ammonia, boron compounds, and various other materials can be used as a fuel. Other liquids and gases may be suitable for production of shells for other applications such as in the chemical processing fields petroleum chemical applications, biological materials processing, and food industry applications. The invention has been made to operate utilizing water as the liquid shell material and air as the gas. As stated above, certain gases may be caused to diffuse out of the shell after the formation thereof.

I claim:

1. A method for producing spherical shells of hydrogen, comprising the steps of:
    (a) providing a jet of hydrogen in liquid form;
    (b) injecting a stream of gas into said jet of liquid hydrogen; and
    (c) mechanically disturbing said gas stream at a periodic rate to form uniform gas bubbles in the liquid jet, whereby said bubbles break up the liquid jet into spherical shells of liquid hydrogen.

2. The method of claim 1 further comprising the step of diffusing said gas out of said spherical shells of liquid hydrogen.

3. The method of claim 1 further comprising the step of freezing said spherical shells of liquid hydrogen and then passing said shells through a vapor of material whose boiling point is substantially above the temperature of said shells to obtain condensed outer shells of said material on the surface of said hydrogen shells.

4. The method of claim 2 further comprising the step of freezing said spherical shells of liquid hydrogen and then passing said shells through a vapor of material whose boiling point is substantially above the temperature of said shells to obtain condensed outer shells of said material on the surface of said hydrogen shells.

5. A method for producing spherical shells of deuterated polyethylene, comprising the steps of:
    (a) providing a jet of deuterated polyethylene in liquid form;
    (b) injecting a stream of gas into said jet of deuterated polyethylene;
    (c) mechanically disturbing said gas stream at a periodic rate to form uniform gas bubbles in the liquid jet, whereby said bubbles break up the liquid jet into spherical shells of deuterated polyethylene.

6. The method of claim 5 further comprising the step of diffusing said gas out of said spherical shells of deuterated polyethylene.

7. The method of claim 5 further comprising the step of freezing said spherical shells of deuterated polyethylene and then passing said shells through a vapor of material whose boiling point is substantially above the temperature of said shells to obtain condensed outer shells of said material on the surface of said deuterated polyethylene shells.

8. The method of claim 6 further comprising the step of freezing said spherical shells of deuterated polyethylene and then passing said shells through a vapor of material whose boiling point is substantially above the temperature of said shells to obtain condensed outer shells of said material on the surface of said deuterated polyethylene shells.

9. A method of producing spherical shells of liquid hydrogen with a gas contained within the shells, comprising the steps of:
    forming a stream of said gas by emitting the gas under pressure from a first nozzle;
    forming a jet of liquid hydrogen surrounding the gas stream by emitting the liquid hydrogen under pressure from a second nozzle which is outside said first nozzle and coaxial with said first nozzle; and
    applying a periodic mechanical disturbance to the gas stream;
    whereby the gas stream forms bubbles within the liquid hydrogen jet so that the liquid hydrogen is separated into spherical shells with said gas contained therein.

10. The method of claim 9 wherein the step of applying a periodic mechanical disturbance to the gas stream comprises exciting the gas stream with acoustic energy.

11. The method of claim 9 wherein the step of exciting the gas stream with acoustic energy comprises exciting an ultrasonic transducer mechanically coupled to the first nozzle.

12. A method for producing spherical shells of deuterated polyethylene with a gas contained within the shells, comprising the steps of:
    forming a stream of said gas by emitting the gas under pressure from a first nozzle;
    forming a jet of liquid deuterated polyethylene surrounding the gas stream by emitting the deuterated polyethylene under pressure from a second nozzle which is outside said first nozzle and coaxial with said first nozzle; and
    applying a periodic mechanical disturbance to the gas stream;
    whereby the gas stream forms bubbles within the liquid jet so that the liquid is separated into spherical shells of deuterated polyethylene with said gas contained therein.

13. The method of claim 12 wherein the step of applying a periodic mechanical disturbance to the gas stream comprises exciting the gas stream with acoustic energy.

14. The method of claim 13 wherein the step of exciting the gas stream with acoustic energy comprises exciting an ultrasonic transducer mechanically coupled to the first nozzle.

* * * * *